May 20, 1924.
J. SIDES
ICE CREAM CONTAINER
Filed June 12, 1922
1,494,981
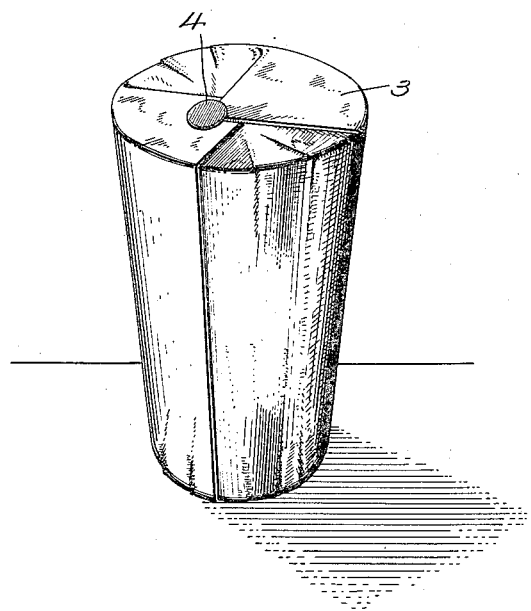
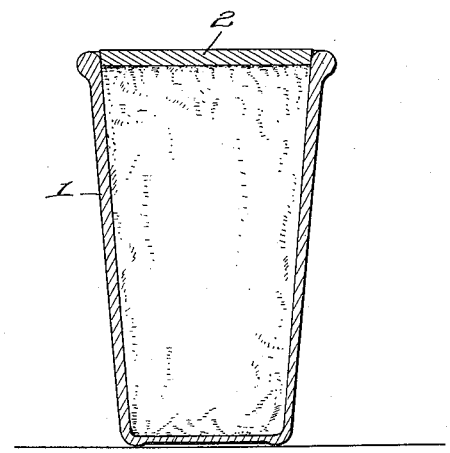
J. Sides.
INVENTOR.
BY Geo. P. Kimmel.
ATTORNEY.

Patented May 20, 1924.

1,494,981

UNITED STATES PATENT OFFICE.

JUDSON SIDES, OF ABILENE, TEXAS.

ICE-CREAM CONTAINER.

Application filed June 12, 1922. Serial No. 567,681.

*To all whom it may concern:*

Be it known that I, JUDSON SIDES, a citizen of the United States, residing at Abilene, in the county of Taylor and State of Texas, have invented certain new and useful Improvements in Ice-Cream Containers, of which the following is a specification.

This invention has reference to ice cream containers and is designed to serve a purpose similar to that of an ice cream cone, and its object is to provide for the dispensing of ice cream in a sanitary and convenient manner with the ice cream when in the container, preserved from contamination and whereby the ice cream may be conveniently handled by the purchaser.

It is the design of the invention to construct the container of a cake or cone-like material baked so as to render the container relatively stiff and resistant to distorting forces and which may be also conveniently eaten at the same time that the ice cream is eaten and moreover which will be tasteful to the purchaser.

Moreover, the container is provided with a closure holding the ice cream within the container and withstanding considerable rough handling and is not liable to be affected by the presence of the ice cream within the container, while shipped from place to place or while being subjected to the action of freezing or the like.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claim.

In the drawings:—

Figure 1 is a perspective view of an ice cream container with an exterior protecting wrapping.

Fig. 2 is a longitudinal vertical section of the container with ice cream therein, but with the exterior wrapping omitted.

Referring to the drawings, there is shown in Fig. 2, a container 1, which may be considered as formed of a cup manufactured of a cake-like material baked to the usual crisp consistency usually prevalent in ice cream cones.

Any particular form of the containers is not at all obligatory, but it is quite feasible to make the container in the general shape of a tumbler with the bottom end closed and in the upper end a wafer-like closure so as to protect the contents of the container and prevent the access of dirt or other contaminating matter, such wafer being indicated at 2.

After filling the cup with ice cream, it is exteriorly covered by a wrapping 3 of paraffin paper or other such material which will avoid the access of heat to the contents of the container, whereby the ice cream will be prevented from melting for a materially longer time than would be the case if the outer wrapping or covering 3 were omitted.

After the wrapping 3 is applied, it may be sealed by a retaining wafer 4 completing the closure and fully protecting the ice cream not only to an extent from the access of exterior heat, but preventing any spoiling of the contents of the container by access of exterior contaminating matter.

After the containers have been filled with ice cream and wrapped and sealed, the ice cream may be subjected to a freezing process by means of which the ice cream is hardened before being shipped or sold.

The paraffin paper is, of course, not edible, and must be removed either in part or in whole before the container with the ice cream contents is eaten, but as the container is to be eaten, except the paper wrapping, there is no waste and no expense for wrapping.

Since the container with its ice cream contents is wholly protected from contamination due to handling, the container has the advantage of being markedly sanitary and the freedom from contamination markedly commends the invention.

By making the container of tumbler form, no special support is needed for the container since the wide base or bottom will amply support the container with its load of ice cream, without danger of upsetting.

What is claimed is:—

A package comprising a cup of edible material filled with ice cream, a removable edible disc-like body of a diameter equal to the diameter of the mouth of said cup, and positioned within and frictionally engaging with the cup for closing said mouth, and a water proof covering enveloping said cream filled cup and sealed at the mouth of the cup to prevent the entrance of contaminating material.

In testimony whereof, I affix my signature hereto.

JUDSON SIDES.